United States Patent
Hirose et al.

(10) Patent No.: US 8,197,370 B2
(45) Date of Patent: Jun. 12, 2012

(54) CHAIN TENSIONER HAVING BIASED DISABLING MECHANISM

(75) Inventors: Takehiko Hirose, Ishikawa (JP); Hitoshi Hamano, Ishikawa (JP); Toshimitsu Yoshimura, Ishikawa (JP)

(73) Assignee: Daido Kogyo Co., Ltd., Kaga-shi (JP)

( * ) Notice: Subject to any disclaimer, the term of this patent is extended or adjusted under 35 U.S.C. 154(b) by 459 days.

(21) Appl. No.: 12/439,800

(22) PCT Filed: Sep. 28, 2007

(86) PCT No.: PCT/JP2007/069061
§ 371 (c)(1),
(2), (4) Date: Mar. 3, 2009

(87) PCT Pub. No.: WO2008/038792
PCT Pub. Date: Apr. 3, 2008

(65) Prior Publication Data
US 2010/0197431 A1    Aug. 5, 2010

(51) Int. Cl.
*F16H 7/22* (2006.01)
(52) U.S. Cl. ........................ 474/110
(58) Field of Classification Search .......... 474/101, 474/109, 110
See application file for complete search history.

(56) References Cited

U.S. PATENT DOCUMENTS

| | | | | |
|---|---|---|---|---|
| 3,426,606 A | * | 2/1969 | Hopkins | 474/111 |
| 4,190,025 A | * | 2/1980 | Wahl | 123/90.31 |
| 4,395,250 A | * | 7/1983 | King | 474/111 |
| 4,395,251 A | * | 7/1983 | King et al. | 474/111 |
| 4,505,691 A | * | 3/1985 | Kohler | 474/101 |
| 4,940,447 A | * | 7/1990 | Kawashima et al. | 474/110 |
| 5,055,089 A | | 10/1991 | Ojima | |
| 5,713,809 A | * | 2/1998 | Yamamoto et al. | 474/110 |
| 5,797,817 A | * | 8/1998 | Senftleben et al. | 474/110 |
| 5,860,881 A | * | 1/1999 | Tada | 474/110 |
| 5,961,410 A | * | 10/1999 | Yamamoto | 474/110 |
| 6,045,471 A | * | 4/2000 | Suzuki | 474/109 |
| 6,117,033 A | * | 9/2000 | Simpson | 474/110 |
| 6,129,644 A | * | 10/2000 | Inoue | 474/110 |
| 6,746,352 B1 | * | 6/2004 | Poiret et al. | 474/110 |
| 6,878,082 B2 | * | 4/2005 | Seungpyo | 474/109 |
| 6,935,978 B2 | * | 8/2005 | Hayakawa et al. | 474/109 |
| 7,063,634 B2 | * | 6/2006 | Hashimoto et al. | 474/110 |
| 2004/0171447 A1 | | 9/2004 | Okabe et al. | |
| 2005/0255952 A1 | * | 11/2005 | Yoshida | 474/110 |
| 2005/0272542 A1 | * | 12/2005 | Yoshida | 474/110 |
| 2006/0293136 A1 | * | 12/2006 | Markley et al. | 474/140 |

FOREIGN PATENT DOCUMENTS

| | | |
|---|---|---|
| JP | 02-309042 A | 12/1990 |
| JP | 5-86057 U | 11/1993 |
| JP | 2001-146946 | 5/2001 |
| JP | 2004-263779 | 9/2004 |
| JP | 2005-114002 A | 4/2005 |

* cited by examiner

*Primary Examiner* — Thomas Will
*Assistant Examiner* — Mai Nguyen
(74) *Attorney, Agent, or Firm* — Arent Fox LLP

(57) ABSTRACT

A chain tensioner (1) having a plunger (12) slidably assembled in a cylinder portion (13) together with a return spring (11), the chain tensioner (1) further has a stopper plate (22) having a through-hole (22a) formed therein, through which the plunger (12) is inserted; and a biasing member (24) disabling movement of the plunger (12), by applying a biasing force to the end of the stopper plate (22) so as to incline the stopper plate (22), the chain tensioner is configured to apply a hydraulic pressure of a hydraulic oil of an engine to the stopper plate (22), so as to reduce the inclination of the stopper plate (22) against the biasing force applied by the biasing member (24), to thereby allow movement of the plunger (12).

8 Claims, 5 Drawing Sheets

STATE BEFORE BEING
ATTACHED TO THE ENGINE,
MOVEMENT BEING DISABLED

STATE OF ENGINE
UNDER OPERATION,
MOVEMENT BEING ALLOWED

STATE OF ENGINE STOP,
MOVEMENT BEING DISABLED

STATE OF ENGINE STOP,
SETBACK OF PLUNGER
BEING INHIBITED

PLANAR SECTION VIEW     ENLARGED VIEW

CHAIN TENSIONER HAVING BIASED DISABLING MECHANISM

TECHNICAL FIELD

The present invention relates to a chain tensioner used for appropriately keeping tension of a power transmission chain, while absorbing changes in the tension of chain due to temperature changes and time-dependent changes.

BACKGROUND ART

In a power transmission mechanism configured to transmit rotation of a crank shaft to cam shafts via a chain, the tension of the chain is kept constant by providing a chain tensioner on the slack side of the chain so as to apply an adjustment force of the chain tensioner to the chain.

A general chain tensioner is configured to have a spring and a plunger assembled in a cylinder portion formed in a housing. When the chain slacks, the plunger biased by the spring advances to pressurize the chain, so as to keep an appropriate tension. On the other hand, when the chain produces tension enough to push the plunger, the chain tensioner operates so as to buffer the setback of the plunger, with the aid of hydraulic pressure of a hydraulic oil supplied behind the plunger.

In thus-configured conventional chain tensioner, the chain may produce thereon a large tension depending on the position of the cams when the engine stops, and may thereby largely set back the plunger. In this case, re-start of the engine may sometimes cause an abrupt slack of the chain, thereby the plunger may largely advance to produce an abnormal sound.

Aiming at solving the above-described problem, there has been proposed a chain tensioner configured to control the amount of setback of the plunger.

For example, Patent Document 1 discloses a chain tensioner configured to limit the setback of the plunger while making use of a ratchet.

Patent Document 2 discloses a chain tensioner configured to limit the setback of the plunger, by allowing a resister clip, for clamping a circumferential groove formed on the plunger, to come into contact with the rear side face of a guide groove formed on the cylinder portion of the housing, and by further allowing the engagement surface of the circumferential groove, provided to the outer circumference of the plunger, to come into contact with the resister clip.

Patent Document 3 discloses a chain tensioner configured to have a lock mechanism, which inhibits setback of the plunger making use of a piston engageable, in the orthogonal direction, with a rack formed on the circumferential surface of the plunger, and which can be unlocked by applying hydraulic pressure to the piston.

Patent Document 4 discloses a chain tensioner having a tension rod and a flat washer having a through-hole allowing therethrough insertion of the tension rod, and configured to enable and disable movement of the tension rod, by varying inclination of the flat washer under frictional force applied thereto, by forward and setbacks of the tension rod.

The chain tensioner disclosed in Patent Document 1, however, needs be provided with a large ratchet having an intricate structure. The chain tensioner disclosed in Patent Document 2 needs formation of a plurality of grooves having complex geometries. The chain tensioner disclosed in Patent Document 3 needs formation of the rack, so that the locking mechanism may be more complicated, and may need a larger number of components. The chain tensioner disclosed in Patent Document 4 is configured to disable motion of the tension rod, by applying frictional force to the flat washer by forward and setbacks, to thereby vary the inclination of the flat washer. For this reason, a strict dimensional accuracy may be required for the outer diameter of the tension rod and the inner diameter of the flat washer, in order to ensure normal operation. In addition, a stopper pin may be necessary in order to allow forward motion of the tension rod from the initial state, or the idle state, so that the housing needs be machined to accommodate the stopper pin. As has been described in the above, all prior arts suffer from problems in that the structure and processes may be complicated, and thereby the cost for manufacturing may increase.

The present invention was conceived after considering the above-described situation, an object of which is to provide a chain tensioner configured to limit the amount of setback of the plunger, which is simple in the structure, readily manufacturable, and capable of reducing the cost.

Patent Document 1: Japanese Patent Application Laid-Open No. 2004-263779
Patent Document 2: Japanese Patent Application Laid-Open No. 2001-146946
Patent Document 3: Japanese Utility Application Laid-Open No. 5-86057
Patent Document 4: Japanese Patent Application Laid-Open No. 2-309042

SUMMARY OF THE INVENTION

According to an aspect of the present invention, a chain tensioner has a housing having a bottomed cylinder portion; a plunger slidably assembled in the cylinder portion; a spring applying a biasing force to the plunger in the direction of projecting the plunger out from the cylinder portion; and a check valve supplying a fluid into a hydraulic compartment formed between the bottom of the cylinder portion and the plunger, to thereby prevent the counter-flow of the fluid, the chain tensioner further includes: a stopper plate having a through-hole formed therein, through which the plunger is inserted; and a biasing member disabling movement of the plunger, by applying a biasing force to the end of the stopper plate so as to incline the stopper plate, the chain tensioner is configured to apply a hydraulic pressure to the stopper plate, so as to reduce the inclination of the stopper plate against the biasing force applied by the biasing member, to thereby allow movement of the plunger.

In the above-described chain tensioner, the check valve is provided on the inner circumferential surface, and in the vicinity of the bottom, of the cylinder portion.

In the above-described chain tensioner, the housing has compartments formed on both sides thereof while placing the end of the stopper plate in between, one compartment being provided with the biasing member, and the other compartment being configured to allow therein introduction of a fluid for reducing the inclination of the stopper plate.

In the above-described chain tensioner, there is formed a hole which allows therethrough communication of the compartment provided with the biasing member with the external.

In the above-described chain tensioner, each of the fluid supplied through the check valve to the hydraulic compartment, and the fluid reducing the inclination of the stopper plate, is a hydraulic oil from an engine.

In the above-described chain tensioner, the biasing member is a plate spring.

In the above-described chain tensioner, the housing has an engagement groove formed thereon, into which the end of the stopper plate is inserted while keeping a clearance therebetween.

In the above-described chain tensioner, the housing is provided with a step which is brought into contact with the stopper plate inclined when the plunger sets back.

According to the chain tensioner of the present invention, the plunger is prevented from largely setting back, even if a large tension is produced on the chain when the engine stops, typically by generating inclination of the stopper plate as soon as the engine stops so as to disable movement of the plunger. On the other hand, when the engine starts, motion of the plunger is allowed by immediately applying hydraulic force to the stopper plate so as to reduce the inclination of the stopper plate, to thereby rapidly apply adjustment force to the chain.

DETAILED DESCRIPTION OF THE PREFERRED EMBODIMENTS

First Embodiment

Figure 1:
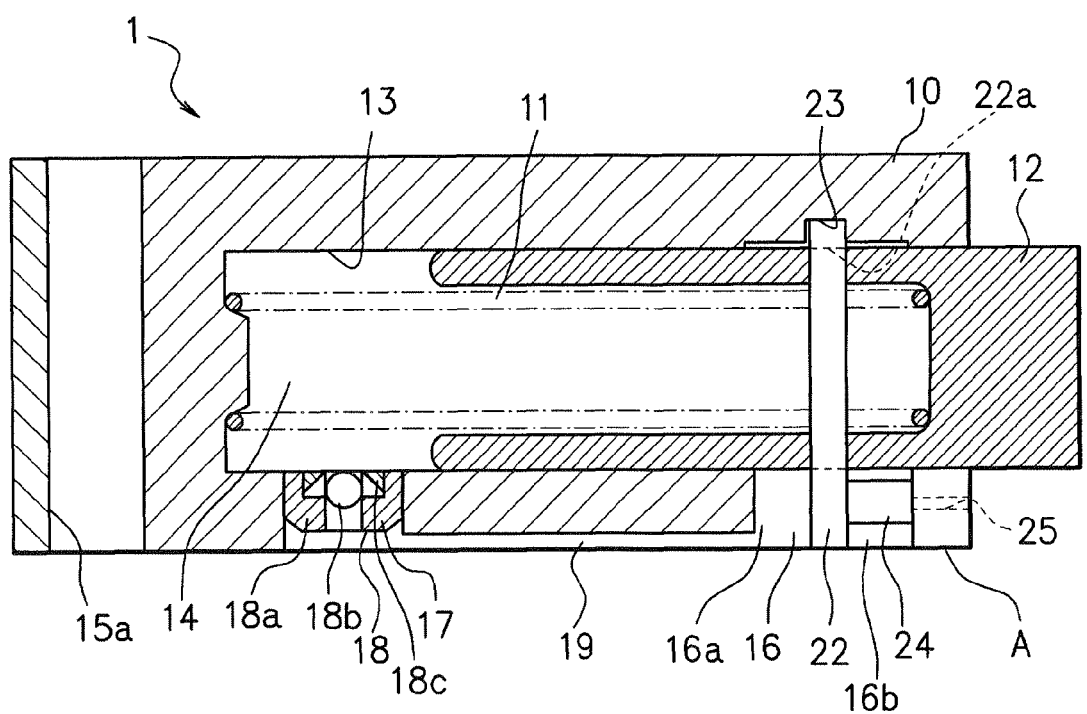
FIG. 1 is a sectional view of a chain tensioner according to a first embodiment of the present invention.
Figure 2:
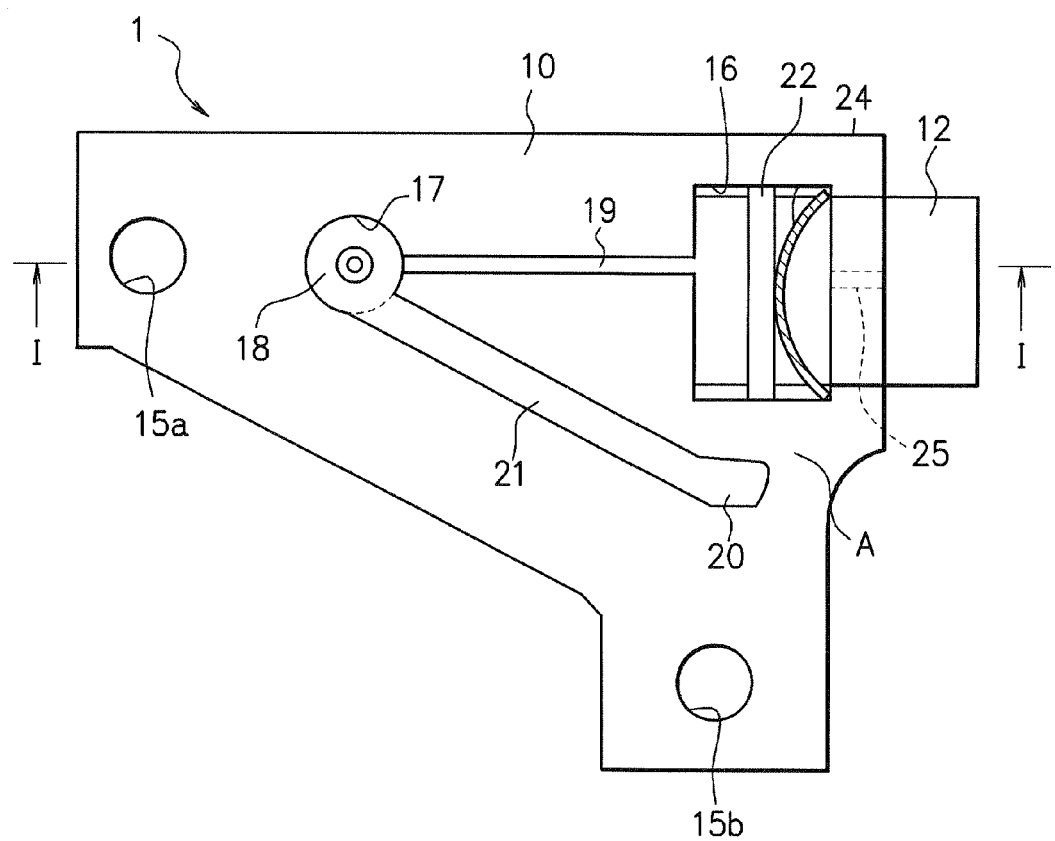
FIG. 2 is a side elevation of the chain tensioner according to the first embodiment of the present invention.

A first embodiment of the present invention will be explained referring to the attached drawings. FIG. 1 and FIG. 2 illustrate a chain tensioner 1 according to the first embodiment of the present invention, wherein FIG. 1 is a sectional view taken along line I-I in FIG. 2, and FIG. 2 is a side elevation.

As an overall configuration of the chain tensioner 1 of this embodiment, a return spring 11 and a plunger 12 are assembled in a cylinder portion 13 of a housing 10. With the aid of the plunger 12 biased by the return spring 11 in the projecting-out direction, an adjustment force is applied to an unillustrated chain. The configuration will further be detailed below.

In the drawings, reference numeral 10 denotes a housing molded typically by aluminum die-casting. Reference numeral 13 denotes a bottomed cylinder portion provided in the housing 10 just as being drilled therein, wherein the plunger 12 is slidably assembled in the cylinder portion 13 together with the return spring 11. As a result of assemblage of the plunger 12 in the cylinder portion 13, a hydraulic compartment 14 is formed between the bottom of the cylinder portion 13 and the plunger 12. Reference numerals 15a and 15b denote fixing holes formed in the housing 10, and are used when the chain tensioner 1 is attached to an engine.

Reference numeral 16 denotes a stopper plate enclosing space formed so as to make communication between a portion in the vicinity of the front edge of the cylinder portion 13 and the end face "A" of the housing 10, in which the stopper plate 22 described later is enclosed. Reference numeral 17 denotes a check valve fixing holes formed so as to make communication between a portion in the vicinity of the bottom of the cylinder portion 13 and the end face "A" of the housing 10, in which the check valve 18 is mounted.

Reference numeral 18 denotes a check valve attached in the check valve fixing hole 17. The check valve 18 is composed of a valve seat 18a fixed by press-fitting in the check valve fixing hole 17, a ball 18b seated on a valve seat, and a restriction member 18c restricting jumping-out of the ball 19b. When the plunger 12 moves forward as a result of slack of an unillustrated chain, the hydraulic pressure in the compartment 14 is lowered, so that the check valve 18 opens to thereby allow therethrough flowing of an hydraulic oil into the hydraulic compartment 14. On the other hand, when the chain produces tension and thereby produces force of pressurizing the plunger 12, the force of pressurizing is buffered by a hydraulic oil in the hydraulic compartment 14. The hydraulic oil in the hydraulic compartment 14 herein is prevented from reversely flowing, while the check valve 18 is kept closed. When the force of pressurizing exceeds the biasing force of the return spring 11, the plunger 12 sets back, and the hydraulic oil in the hydraulic compartment 14 leaks through a gap between the sliding surfaces of the cylinder portion 13 and the plunger 12 to the external.

Reference numeral 19 denotes a hydraulic oil passageway, given in a groove form on the end face "A" of the housing 10, through which the stopper plate enclosing space 16 and the check valve fixing hole 17 are communicated. Reference numeral 20 denotes a hydraulic oil supply unit to which the hydraulic oil is supplied from the engine side. Reference numeral 21 denotes a passageway for hydraulic oil, given in a groove form on the end face "A" of the housing 10, through which the check valve fixing hole 17 and the hydraulic oil supply 20 are communicated.

Figure 3:
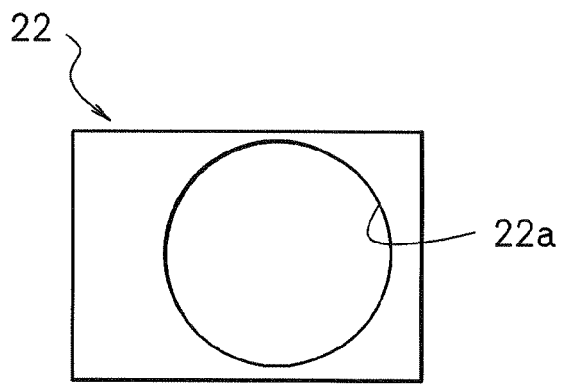
FIG. 3 is a drawing illustrating a stopper plate according to the first embodiment of the present invention.

Reference numeral 22 denotes a stopper plate, configured by, as illustrated in FIG. 3, a metal plate having a through-hole 22a formed therein. The diameter of the through-hole 22a is set equivalent to, or slightly larger than the outer diameter of the plunger 12, so as to allow therethrough insertion of the plunger 12.

Reference numeral 23 denotes an engagement groove formed in the stopper plate enclosing space 16, into which one end of the stopper plate 22 is inserted, while keeping the stopper plate 22 housed in the stopper plate enclosing space 16. By virtue of the insertion of the end of the stopper plate 22 into the engagement groove 23, the stopper plate 22 may be prevented from being displaced forward and backward. Note that the dimension of the engagement groove 23 is designed to allow a certain degree of inclination of the stopper plate 22 as described later. More specifically, the engagement groove 23 is formed to have a width larger than the thickness of the stopper plate 22, typically referred to as in FIG. 1, so as to allow insertion of a part of the end of the stopper plate 22 while keeping a clearance in between (in other words, insertion with some margin). When the stopper plate 22 is housed in the stopper plate enclosing space 16, there are formed a compartment 16a and a compartment 16b, both of which communicate with the hydraulic oil passageway 19, on both sides of the stopper plate 22 while placing the end thereof in between.

Reference numeral 24 denotes a plate spring provided to the compartment 16*b*, which applies a biasing force to the other end, which is the opposite side of the engagement groove 23 side, of the stopper plate 22, in the direction of pressurizing the plunger 12. Reference numeral 25 is an oil drain hole, which is formed so as to allow the compartment 16*b* of the stopper plate enclosing space 16, having the plate spring 24 provided therein, to communicate with the external. Note that the oil drain hole 25, illustrated just as being drilled in the drawing, may be given in a groove form on the end face "A" of the housing 10, similarly to the hydraulic oil passageways 19, 21.

In the chain tensioner 1 described in the above, an unillustrated cover is attached to the end face "A" of the housing 10. Alternatively, the end face "A" of the housing 10 is directly fixed to the attachment surface on the engine side. As a consequence, the stopper plate enclosing space 16, the check valve fixing hole 17, the hydraulic oil passageway 19 and the hydraulic oil passageway 21 are tightly enclosed. When the chain tensioner 1 is attached in this way, the fixing holes 15*a* and 15*b* are used.

In the state of attachment of the chain tensioner 1, the hydraulic oil supplied from the engine side to the hydraulic oil supply unit 20 may be allowed to flow through the hydraulic oil passageway 21 to the check valve 18, and further branched to the hydraulic oil passageway 19 to enter the compartment 16*a*.

The chain tensioner 1 of this embodiment is capable of enabling and disabling movement of the plunger 12 with the aid of the stopper plate 22. Details of the operation will be explained below, referring to FIGS. 4A to 4C.

Figure 4A:
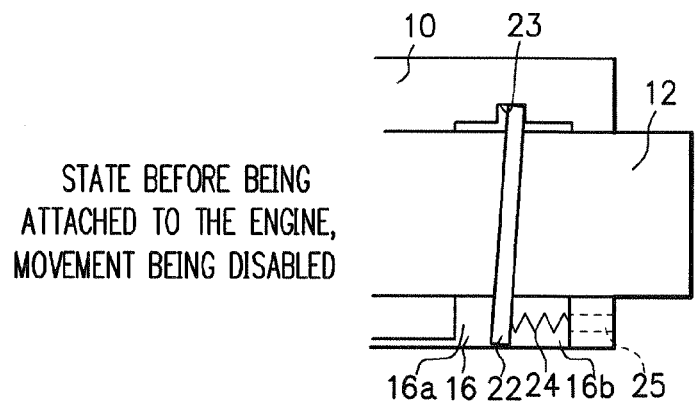
FIG. 4A is a drawing explaining operation of the chain tensioner according to the first embodiment of the present invention.

FIG. 4A illustrates the initial state of the chain tensioner 1, that is, the state before being attached to the engine. In this state, the stopper plate 22 is biased at the end thereof by the plate spring 24, and is thereby inclined in the direction of pressurizing the plunger 12. Accordingly, movement of the plunger 12 is disabled, due to interference between the plunger 12 and the through-hole 22*a*.

Figure 4B:
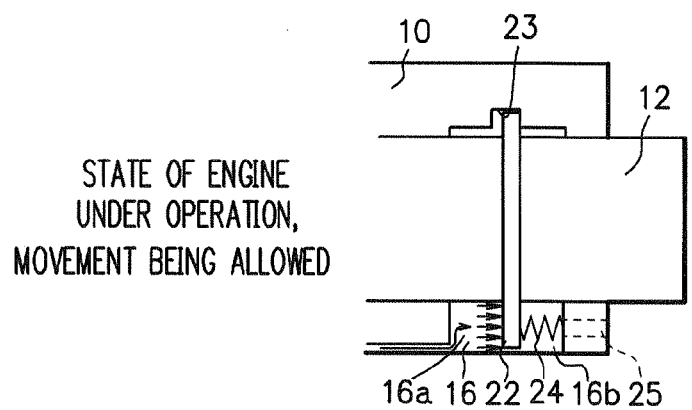
FIG. 4B is a drawing explaining operation of the chain tensioner according to the first embodiment of the present invention.
Figure 4C:
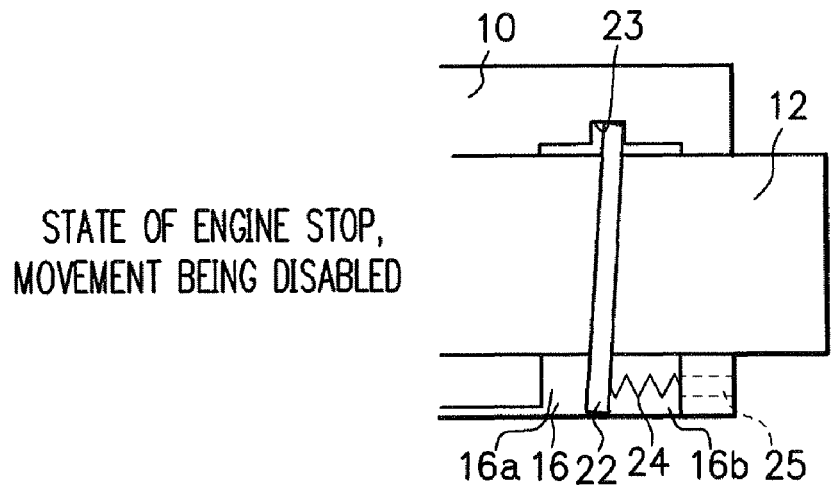
FIG. 4C is a drawing explaining operation of the chain tensioner according to the first embodiment of the present invention.

FIG. 4B and FIG. 4C illustrate a state of the chain tensioner 1 attached to the engine. FIG. 4B illustrates the state of engine under operation. As soon as the engine starts to operate, the hydraulic oil is supplied from the engine side to the hydraulic oil supply unit 20, and the hydraulic oil flows through the hydraulic oil passageway 21 to the check valve 18, and further branches to the hydraulic oil passageway 19 and enters the compartment 16*a*. The hydraulic oil entered the compartment 16*a* pressurizes the stopper plate 22 by its hydraulic pressure, so as to reduce the inclination of the stopper plate 22 against the biasing force applied by the plate spring 24. By thus reducing the inclination of the stopper plate 22, interference between the through-hole 22*a* and the plunger 12 is removed, the plunger 12 is thus allowed to move, and thereby the adjustment force may be exerted.

Figure 4D:
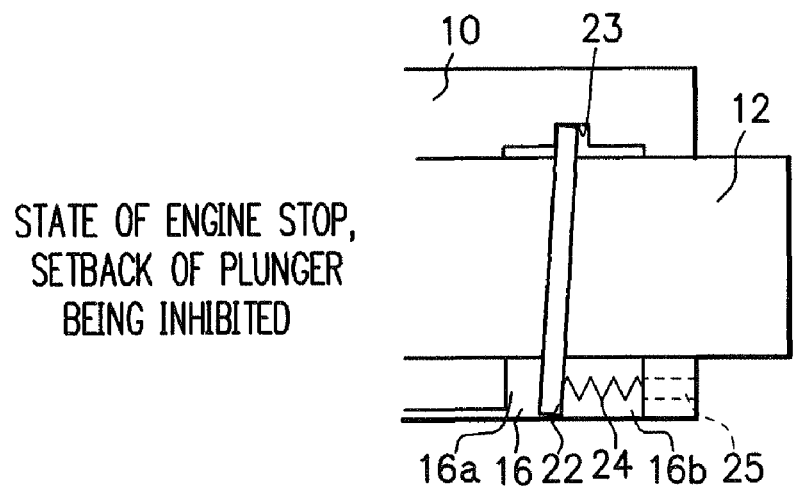
FIG. 4D is a drawing explaining operation of the chain tensioner according to the first embodiment of the present invention.

FIG. 4C illustrates the state of engine stop. As soon as the engine stops, supply of the hydraulic oil to the hydraulic oil supply unit 20 stops. As a consequence, the hydraulic pressure of the hydraulic oil in the compartment 16*a* lowers, the stopper plate 22 is again brought back to the inclined state by virtue of the biasing force applied by the plate spring 24, so as to disable movement of the plunger 12. In other words, when the chain generates a large tension so as to exert a force which functions enough to set back the plunger 12, depending on the stop position of the cam during the engine stop, the stopper plate 22 comes into contact with the end of the engagement groove 23, and thereby the setback of the plunger 12 is inhibited (see FIG. 4D). The plunger 12 herein is applied with frictional force by two points in the through-hole 22*a* of the stopper plate 22 and the inner circumferential surface of the cylinder portion 13, so that the setback of the plunger 12 may exactly be inhibited. Details of this operation will be described later in a second embodiment. The setback of the plunger 54 in this embodiment is inhibited by the stopper plate 22 which is brought into contact with the end of the groove-form engagement groove 23, whereas the setback of the plunger 54 may be inhibited also simply by providing a step which may be brought into contact with the stopper plate 22 inclined when the plunger 54 sets back, rather than providing the groove form.

In the state of flowing of the hydraulic oil during the engine operation, there may be a risk of leakage of the hydraulic oil from the compartment 16*a* to the compartment 16*b* having the plate spring 24 provided therein. The hydraulic oil may, however, be drained from the compartment 16*b*, by providing the oil drain hole 25, so that the operations of the stopper plate 22 and the plate spring 24 will not adversely affected.

According to the chain tensioner 1 of this embodiment configured as described in the above, movement of the plunger 12 is disabled as soon as the engine stops, so that even if a large tension is produced on the chain, the plunger 12 may be prevented from largely setting back. On the other hand, during the engine operation, the hydraulic oil will immediately be supplied to allow motion of the plunger 12, and thereby the chain strainer may rapidly be brought into the state of applying the adjustment force to the chain.

Since the motion of the plunger 12 may be enabled or disabled as described in the above, only by a simple structure which makes use of hydraulic pressure, while being provided with the stopper plate 22 having the through-hole 22*a* allowing therethrough insertion of the plunger 12, and the plate spring 24 applying biasing force to the stopper plate, so that the chain strainer may readily be manufactured, and the cost therefor may be reduced.

Note that the present invention is not limited to this embodiment, and may be modified without departing from the present invention. For example, the plunger 12 in this embodiment was configured to shorten the length of the plunger 12 in the axial direction thereof, by providing the check valve 18 to the end face "A" side of the housing 10, or in the vicinity of the bottom on the inner circumferential surface of the cylinder portion 13, whereas the check valve 18 may alternatively be provided to the bottom of the cylinder portion 13.

The biasing member applying biasing force to the stopper plate 22, configured in the above by the plate spring 24, may alternatively be configured by a coil spring. To which compartments, out of two compartments 16*a* and 16*b* formed in the stopper plate enclosing space 16 by the stopper plate 22, the biasing member should be provided, may be a matter of design. For example, the biasing member may be provided to the compartment 16*a* on the flow-in side of the hydraulic oil, so as to pull the stopper plate 22 in the direction of pressurizing the plunger 12.

In the chain tensioner 1, the surface roughness of the inner circumferential surface of the through-hole 22*a* of the stopper plate 22 may preferably be set larger than the surface roughness of the outer circumferential surface of the plunger 12. If the surface roughness of the outer circumferential surface of the plunger 12 is large, wear of the outer circumferential surface of the plunger 12 and the inner circumferential surface of the cylinder portion 11 may proceed. On the other hand, any attempt of suppressing the wear by reducing the surface roughness of the outer circumferential surface of the plunger 12 may reduce, as a matter of course, the frictional force which effects between the plunger 12 and the stopper plate 22, and may only insufficiently lock the plunger 12 by the stopper plate 22. Accordingly, the surface roughness of the inner circumferential surface of the stopper plate 22 is preferably set larger than the surface accuracy of the outer circumferential surface of the plunger 12, taking both aspects of friction and locking into consideration.

Because the frictional force effects between the plunger 12 and the stopper plate 22, it may be necessary to select a material excellent in the wear resistance for the stopper plate 22, for which also strength may be necessary because the stopper plate 22 is loaded also with pressure by the hydraulic oil and so forth. On the other hand, taking readiness and cost of manufacturing into consideration, the stopper plate 22 may preferably be processed by punching based on pressing and so forth. Taking both aspects of material characteristics and cost for manufacturing into consideration, it may be preferable to select a material which is not only allowed for punching, but also excellent in the strength, hardening property and wear resistance. For example, alloyed steels such as SAE1050, SAE5046, K5 and so forth may preferably be used. It may also be preferable to partially subject the stopper plate 22 to annealing in order to improve the wear resistance and strength. In this case, the wear resistance and strength may partially be improved, typically by adopting carburizing-and-quenching or induction hardening only to the inner circumferential portion of the through-hole 22a of the stopper plate 22.

In the chain tensioner 1, it may be necessary to appropriately adjust a relation between the hydraulic pressure of the hydraulic oil supplied from the engine side, and the spring load of the plate spring 24 as the biasing member. As described previously, in the chain tensioner 1, forward and setbacks of the plunger 12 are inhibited if the stopper plate 22 is inclined by the plate spring 24, and the forward and setbacks are allowed if the inclination of the stopper plate 22 is reduced by the hydraulic pressure applied thereto. For this reason, a relation of (applied pressure×plate area)>(spring load) is necessarily satisfied between the hydraulic pressure applied to the stopper plate 22 and the plate spring 24.

Note that the plate area herein corresponds to a portion where the stopper plate 22 is applied with the hydraulic pressure.

By appropriately adjusting the hydraulic pressure and the spring load of the biasing member conforming to the relation in the above, the chain tensioner 1 may be allowed to operate correctly.

As for the angle of inclination of the stopper plate 22 in a state where the stopper plate 22 is biased at the end portion thereof by the plate spring 24, and thereby inclined in the direction of pressurizing the plunger 12 (for example, the states illustrated in FIG. 4A and FIG. 4C), a smaller angle may more advantageously reduce the stopper plate enclosing space 16 and the space of engagement groove 23, and may downsize the plate spring 24, so that a compact configuration may be realized. In addition, a smaller angle of inclination of the stopper plate 22 may more rapidly switch the plunger 12 between the states where the motion thereof is enabled and disabled.

Second Embodiment

Figure 5:
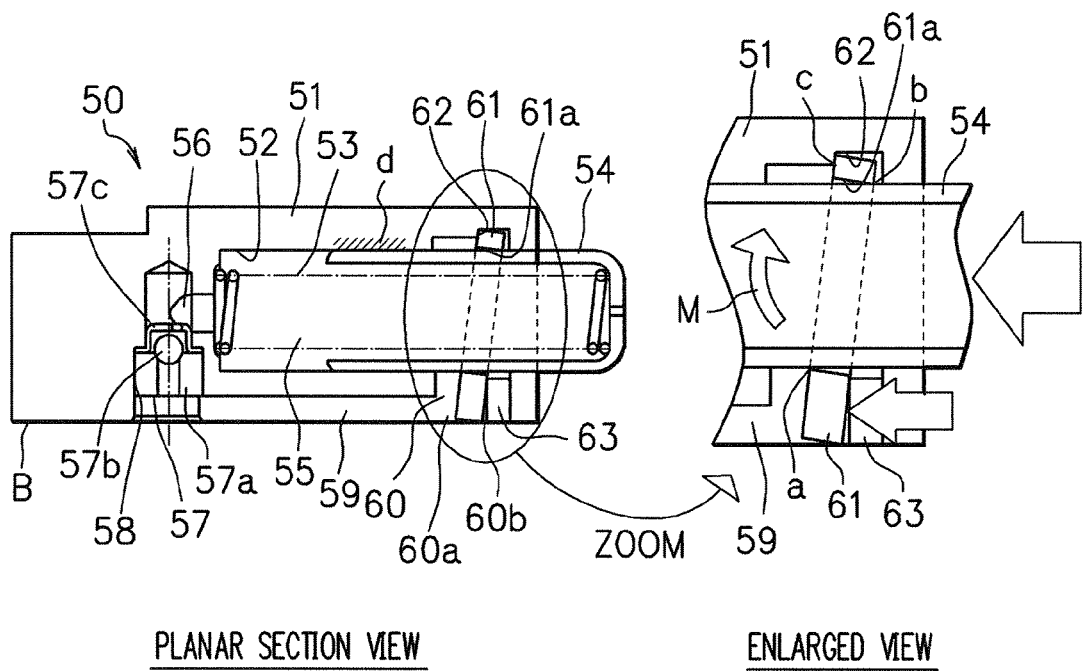
FIG. 5 is a planar sectional view of a chain tensioner according to a second embodiment of the present invention.

Next, a second embodiment of the present invention will be explained. FIG. 5 is a planar sectional view of a chain tensioner 50 according to the second embodiment of the present invention.

An overall configuration of the chain tensioner 50 of this embodiment is similar to that of the first embodiment, wherein a return spring 53 and a plunger 54 are assembled in a cylinder portion 52 of a housing 51. The plunger 54 is biased in the projecting-out direction with the aid of the return spring 53, and thereby the adjustment force is applied to an unillustrated chain. Details of the configuration will be explained below.

In the drawing, reference numeral 51 denotes a metal housing, which may be composed of an aluminum die-cast, or may be formed by casting iron. Reference numeral 52 denotes a cylinder portion drilled in the housing 51. The plunger 54 is slidably assembled together with the return spring 53 into the cylinder portion 52. As a result of assemblage of the plunger 54 in the cylinder portion 52, a hydraulic compartment 55 is formed between the bottom of the cylinder portion 52 and the plunger 54. Reference numeral 56 denotes a hydraulic oil passageway "A", which communicates the bottom of the cylinder portion 52 with the end face "B" of the housing 51, so as to allow therethrough supply of the hydraulic oil from the engine side to the hydraulic compartment 55. As is referred in the drawing, the hydraulic oil passageway A56 extends from the bottom of the cylinder portion 52 in the direction of pressurizing the plunger 54, and bends at right angles in midway to extend towards the end face "B".

Reference numeral 57 denotes a check valve, which is attached to a check valve fixing hole 58 formed to a part of the hydraulic oil passageway A56. The check valve 57 is composed of a valve seat 57a and fixed by press-fitting in the check valve fixing hole 58, a ball 57b seated on a valve seat 57a, and a restriction member 57c restricting jumping-out of the ball 57b. Since the basic structure of the check valve 57 is similar to that explained in the first embodiment, explanation on the operation will not be repeated.

Reference numeral 59 denotes a hydraulic oil passageway B given in a groove form on the end face "A" of the housing 51, and communicates the check valve fixing hole 58 and the stopper plate enclosing space 60. Reference numeral 60 denotes a stopper plate enclosing space formed in the vicinity of the front edge of the cylinder portion 52, in which the stopper plate 61 is housed.

Reference numeral 61 denotes a stopper plate, configured by a metal plate having a through-hole 61a formed therein. The diameter of the through-hole 61a is set equivalent to, or slightly larger than the outer diameter of the plunger 54, so as to allow therethrough insertion of the plunger 54.

Reference numeral 62 denotes an engagement groove formed in the stopper plate enclosing space 60, into which one end of the stopper plate 61 is inserted, while keeping the stopper plate 61 housed in the stopper plate enclosing space 60. By virtue of the insertion of the end of the stopper plate 61 into the engagement groove 62, the stopper plate 61 may be prevented from being displaced forward and backward. Note that the dimension of the engagement groove 62 is designed to allow a certain degree of inclination of the stopper plate 61. More specifically, the engagement groove 62 is formed to have a width larger than the thickness of the stopper plate 61, typically referred in FIG. 5, so as to allow insertion of a part of the end of the stopper plate 61 while keeping a clearance in between (in other words, insertion with some margin). When the stopper plate 61 is housed in the stopper plate enclosing space 60, there are formed a compartment 60a and a compartment 60b, both of which communicate with the hydraulic oil passageway 59, on both sides of the stopper plate 61 while placing the end thereof in between.

Reference numeral 63 denotes a plate spring provided to the compartment 60b, which applies a biasing force to the end of the stopper plate 61, in the direction of pressurizing the plunger 54.

The chain tensioner 50 of this embodiment, configured as described in the above, may enable and disable motion of the plunger 54 with the aid of the stopper plate 61, only with a simple structure similar to the first embodiment.

Now inhibition of setback of the plunger 54 in the chain tensioner 50 will be detailed. As has been described in the first embodiment, when the chain generates a large tension so as to exert a force which functions to set back the plunger 54, depending on the stop position of the cam during the engine stop, the stopper plate 61 comes into contact with the end of the engagement groove 62, and thereby the setback of the plunger 54 is inhibited. The state of the stopper plate 61 referable to FIG. 5 corresponds to a state where the setback of the plunger 54 is inhibited. A mechanism of inhibition of setback of the plunger 54 will be detailed below, referring to FIG. 5.

As is referable to a planar sectional view and an enlarged view in FIG. 5, the setback of the plunger 54 is inhibited, when the stopper plate 61 comes into contact with the end "c" of the engagement groove 62 of the stopper plate enclosing space 60. The plunger 54 herein is applied with frictional force at two edge points (a, b) of the through-hole 61a of the stopper plate 61, and the inner circumferential surface (d) of the cylinder portion 52. The frictional force applied to the plunger 54 at two edge points (a, b) of the through-hole 61a is generated, when the stopper plate 61 is inclined by the plate spring 63 to interfere with the plunger 54, and thereby a force is given by the edge points (a, b) normal to the outer circumferential surface of the plunger 54. Because the plate stopper 61 inclines when the edge points (a, b) of the through-hole 61a interfere with the plunger 54, the plunger 54 will be applied with moment M. The frictional force applied by the inner circumferential surface (d) of the cylinder portion 52 to the plunger 54 generates when the plunger 54 is pressed against the inner circumferential surface (d) of the cylinder portion 52 by the contribution of moment M.

As explained in the above, in the chain tensioner 50 of this embodiment, when the stopper plate 61 inhibits movement of the plunger 54, the frictional force is applied to the plunger 54 by two edge points (a, b) of the through-hole 61a of the stopper plate 61, and the inner circumferential surface (d) of the cylinder portion 52. Accordingly, the setback of the plunger 54 may exactly be inhibited.

When the present invention is applied to this embodiment, it is no more necessary to form groove or the like on the outer circumferential surface of the plunger 54, so that the plunger 54 may be manufactured simply by plastic deformation of a steel pipe, typically by deep drawing or pressing. A drawing for explaining an exemplary process of the plunger 54 is illustrated in FIG. 6.

Figure 6:
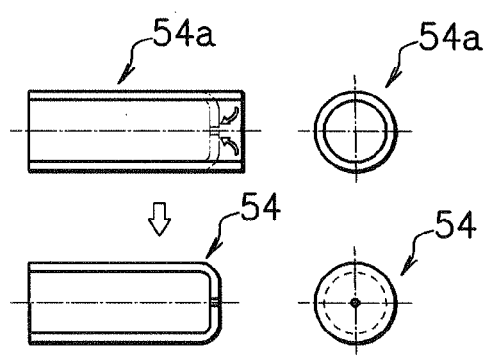
FIG. 6 is a drawing explaining a plunger used in the chain tensioner according to the second embodiment of the present invention.

In FIG. 6, a steel pipe 54a before processing is illustrated on the top, and the processed plunger 54 is illustrated on the bottom. In this example, by pressing the steel pipe 54a with a force applied in the direction indicated by an arrow in the drawing (in the center direction of steel pipe), the cylindrical plunger 54 closed at the tip thereof as illustrated on the bottom may be formed. In this example, the plunger 54 is configured to have a leakage hole for the hydraulic oil at the end thereof, so that the plunger 54 may leak therethrough the hydraulic oil. Besides this example, a plunger similar to the plunger 54 may alternatively be formed also by drawing a circular iron sheet.

As has been described in the above, in the chain tensioner 50 of this embodiment, the plunger 54 is formed by drawing or pressing, so that the manufacturing may be simple, and the cost for manufacturing may largely be reduced. The chain tensioner 1 explained in the first embodiment and the chain tensioner 50 explained in the second embodiment have the same basic structure despite some difference in the fine geometry or the like, so that it may of course be allowable to adopt the plunger 54 explained in the second embodiment to the chain tensioner 1 of the first embodiment. All contents explained in the first embodiment, such as the relation of surface roughness between the plunger and the stopper plate, and materials for composing the stopper plate, may equally apply also to the second embodiment.

INDUSTRIAL APPLICABILITY

As has been described in the above, according to the present invention, movement of the plunger is enabled or disabled by a simple structure provided with a stopper plate having a through-hole in which a plunger is inserted, and a biasing member applying a biasing force to the stopper plate, making use of hydraulic pressure, so that the chain tensioner may readily be manufactured at low cost.

What is claimed is:

1. A chain tensioner comprising a housing having a bottomed cylinder portion; a plunger slidably assembled in the cylinder portion; a spring applying a biasing force to the plunger in the direction of projecting the plunger out from the cylinder portion; and a check valve supplying a fluid into a hydraulic compartment formed between the bottom of the cylinder portion and the plunger, to thereby prevent the counter-flow of the fluid, the chain tensioner further comprises:

a stopper plate having a through-hole formed therein, through which the plunger is inserted;
   a check valve fixing hole defined in a radial outer surface of the housing, the check valve fixing hole being in communication with a fluid supply unit via a groove shaped passageway defined in an end face of the housing, the passageway extending from the check valve fixing hole to the fluid supply unit laterally relative to a longitudinal axis of the check valve fixing hole, wherein the check valve is press-fit into the check valve fixing hole and faces an outer circumferential surface of the plunger, an inner face of the check valve defining part of an inner circumferential surface of the cylinder portion along which an outer circumferential surface of the plunger makes direct sliding contact; and
   a biasing member disabling movement of the plunger, by applying a biasing force to the end of the stopper plate so as to incline the stopper plate,
   the chain tensioner is configured to apply a hydraulic pressure to the stopper plate, so as to reduce the inclination of the stopper plate against the biasing force applied by the biasing member, to thereby allow movement of the plunger.

2. The chain tensioner according to claim 1, wherein the check valve is located near a bottom of the cylinder portion where an end face of the spring contacts an end face of the cylinder portion.

3. The chain tensioner according to claim 1, wherein the housing has compartments formed on both sides thereof while placing an end of the stopper plate in between, one compartment being provided with the biasing member, and the other compartment being configured to allow therein introduction of a fluid for reducing the inclination of the stopper plate.

4. The chain tensioner according to claim 3, having a fluid drain hole defined in an end face of the housing and which allows therethrough communication of the compartment provided with the biasing member with an external space located outside of the housing.

5. The chain tensioner according to claim 1, wherein each of the fluid supplied through the check valve to the hydraulic compartment, and the fluid reducing the inclination of the stopper plate, is a hydraulic oil from an engine.

6. The chain tensioner according to claim 1, wherein the biasing member is a plate spring.

7. The chain tensioner according to claim 1, wherein the housing has an engagement groove formed thereon, into which the end of the stopper plate is inserted while keeping a clearance in between opposing faces of the stopper plate and the engagement groove.

8. The chain tensioner according to claim 1, wherein the housing is provided with a step which is brought into contact with the stopper plate inclined when the plunger sets back.

* * * * *

UNITED STATES PATENT AND TRADEMARK OFFICE
CERTIFICATE OF CORRECTION

PATENT NO. : 8,197,370 B2
APPLICATION NO. : 12/439800
DATED : June 12, 2012
INVENTOR(S) : Takehiko Hirose et al.

It is certified that error appears in the above-identified patent and that said Letters Patent is hereby corrected as shown below:

Title Page -

Item (30), Foreign Priority Application Data, please add the Foreign Priority Data information to read as follows:

-- September 28, 2006 (PCT) .............. PCT/JP2006/319260 --

Signed and Sealed this
Nineteenth Day of March, 2013

Teresa Stanek Rea
*Acting Director of the United States Patent and Trademark Office*